United States Patent
Kyogoku (10) Patent No.: US 9,971,274 B2
(45) Date of Patent: May 15, 2018

(54) OPTICAL SCANNING DEVICE PROVIDED IN ELECTROPHOTOGRAPHIC IMAGE FORMING APPARATUS, IMAGE FORMING APPARATUS, AND OPTICAL SCANNING METHOD

(71) Applicant: KYOCERA Document Solutions Inc., Osaka-shi, Osaka (JP)

(72) Inventor: Masanori Kyogoku, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days. days.

(21) Appl. No.: 15/603,234

(22) Filed: May 23, 2017

(65) Prior Publication Data
US 2017/0343922 A1 Nov. 30, 2017

(30) Foreign Application Priority Data
May 26, 2016 (JP) .................. 2016-104984

(51) Int. Cl.
*G03G 15/00* (2006.01)
*G02B 26/00* (2006.01)
(Continued)

(52) U.S. Cl.
CPC .......... *G03G 15/043* (2013.01); *G02B 26/02* (2013.01); *G02B 26/123* (2013.01);
(Continued)

(58) Field of Classification Search
CPC .......... G03G 15/043; G03G 15/04072; G03G 2215/0404; G02B 26/02; G02B 26/123;
(Continued)

(56) References Cited

U.S. PATENT DOCUMENTS 9,217,975 B2 * 12/2015 Kawano .................. G02B 26/10
9,357,097 B1 * 5/2016 Tanaka .................. H04N 1/113
(Continued)

FOREIGN PATENT DOCUMENTS

JP 06031976 A * 2/1994
JP 2011242601 A * 12/2011
(Continued)

*Primary Examiner* — Robert Beatty
(74) *Attorney, Agent, or Firm* — Alleman Hall Creasman & Tuttle LLP (57) ABSTRACT

An optical scanning device includes a rotary polygon mirror, a plurality of light sources, a light detecting portion, an obtainment processing portion, an a switching processing portion. The rotary polygon mirror has a reflection surface that reflects incident light, and scans, in a scanning cycle, the light reflected on the reflection surface. The light sources emit, toward the reflection surface, a plurality of light beams. The light detecting portion detects a light amount of each light beam reflected on the reflection surface. The obtainment processing portion obtains a switching timing to switch a light emission amount of each of the light sources in the scanning cycle, based on light amounts of the light beams detected by the light detecting portion. The switching processing portion switches the light emission amount of each of the light sources based on the switching timing obtained by the obtainment processing portion.

8 Claims, 8 Drawing Sheets

(51) Int. Cl.
*G06K 15/00* (2006.01)
*H04N 1/00* (2006.01)
*G03G 15/043* (2006.01)
*G06K 15/12* (2006.01)
*H04N 1/113* (2006.01)
*G02B 26/02* (2006.01)
*G02B 26/12* (2006.01)

(52) U.S. Cl.
CPC ....... *G02B 26/127* (2013.01); *G06K 15/1209* (2013.01); *G06K 15/1214* (2013.01); *H04N 1/113* (2013.01)

(58) Field of Classification Search
CPC ............. G02B 26/124; G06K 15/1209; G06K 15/1214; H04N 1/113; H04N 1/1135
USPC .................. 399/4, 51, 220; 347/236, 246
See application file for complete search history.

(56) References Cited

U.S. PATENT DOCUMENTS

2003/0030718 A1* 2/2003 Maeda ............... G06K 15/1219
347/250
2016/0291501 A1* 10/2016 Shimba ............... G03G 15/043

FOREIGN PATENT DOCUMENTS

| JP | 2012073558 A | * | 4/2012 |
| JP | 2013105027 A | | 5/2013 |

* cited by examiner

OPTICAL SCANNING DEVICE PROVIDED IN ELECTROPHOTOGRAPHIC IMAGE FORMING APPARATUS, IMAGE FORMING APPARATUS, AND OPTICAL SCANNING METHOD

INCORPORATION BY REFERENCE

This application is based upon and claims the benefit of priority from the corresponding Japanese Patent Application No. 2016-104984 filed on May 26, 2016, the entire contents of which are incorporated herein by reference.

BACKGROUND

The present disclosure relates to an electrophotographic image forming apparatus, an optical scanning device provided in an image forming apparatus, and an optical scanning method implemented in an optical scanning device.

In an image forming apparatus such as a printer that can form an image by the electrophotographic system, a light beam emitted from a light source based on image data is caused to scan an image carrying member such as a photoconductor drum by a rotary polygon mirror, so that an electrostatic latent image corresponding to the image data is formed on the image carrying member. In this type of image forming apparatus, an emission timing at which a light beam corresponding to each line of the image data is emitted, namely, a timing to write the electrostatic latent image is determined based on a detection timing at which a light receiving portion detects a light beam emitted from the light source and scanned by the rotary polygon mirror.

In addition, in this type of image forming apparatus, a reflection surface of the rotary polygon mirror may be stained. In that case, the reflectance of the reflection surface is reduced, and thereby the light amount of the light beam that is scanned by the rotary polygon mirror is reduced. With regard to this problem, there is known an image forming apparatus that can adjust the light emission amount of the light source based on the light amount of the light beam detected by the light receiving portion.

SUMMARY

An optical scanning device according to an aspect of the present disclosure includes a rotary polygon mirror, a plurality of light sources, a light detecting portion, an obtainment processing portion, an a switching processing portion. The rotary polygon mirror has a reflection surface that reflects incident light, and scans, in a predetermined scanning cycle, the light reflected on the reflection surface. The plurality of light sources emit, toward the reflection surface, a plurality of light beams that are separated from each other in an axis direction of a rotation shaft of the rotary polygon mirror. The light detecting portion detects, on a light scanning path of the rotary polygon mirror, a light amount of each of the light beams emitted from the light sources and reflected on the reflection surface. The obtainment processing portion obtains a switching timing to switch a light emission amount of each of the light sources in the scanning cycle, based on light amounts of the light beams detected by the light detecting portion. The switching processing portion switches the light emission amount of each of the light sources based on the switching timing obtained by the obtainment processing portion.

An image forming apparatus according to another aspect of the present disclosure includes the optical scanning device.

An optical scanning method according to a further aspect of the present disclosure is implemented in an optical scanning device including: a rotary polygon mirror having a reflection surface that reflects incident light and configured to scan, in a predetermined scanning cycle, the light reflected on the reflection surface; a plurality of light sources configured to emit, toward the reflection surface, a plurality of light beams that are separated from each other in an axis direction of a rotation shaft of the rotary polygon mirror; and a light detecting portion configured to detect, on a light scanning path of the rotary polygon mirror, a light amount of each of the light beams emitted from the light sources and reflected on the reflection surface. The optical scanning method includes a first step and a second step. In the first step, a switching timing to switch a light emission amount of each of the light sources in the scanning cycle, is obtained based on light amounts of the light beams detected by the light detecting portion. In the second step, the light emission amount of each of the light sources is switched based on the switching timing obtained in the first step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclsure with reference to the accompanying drawings. It should be noted that the following embodiment is an example of a specific embodiment of the present disclosure and should not limit the technical scope of the present disclosure.

[Outlined Configuration of Image Forming Apparatus 10]

First, a configuration of an image forming apparatus 10 according to an embodiment of the present disclosure is described with reference to FIG. 1 and FIG. 2. Here, FIG. 1 is a schematic cross-sectional view showing a configuration of the image forming apparatus 10.

The image forming apparatus 10 is a multifunction peripheral having a plurality of functions such as a scan function for reading image data from a document sheet, a print function for forming an image based on image data, a facsimile function, and a copy function. It is noted that the present disclosure is applicable to other types of image forming apparatuses such as a printer device, a facsimile device, and a copier.

Figure 1:
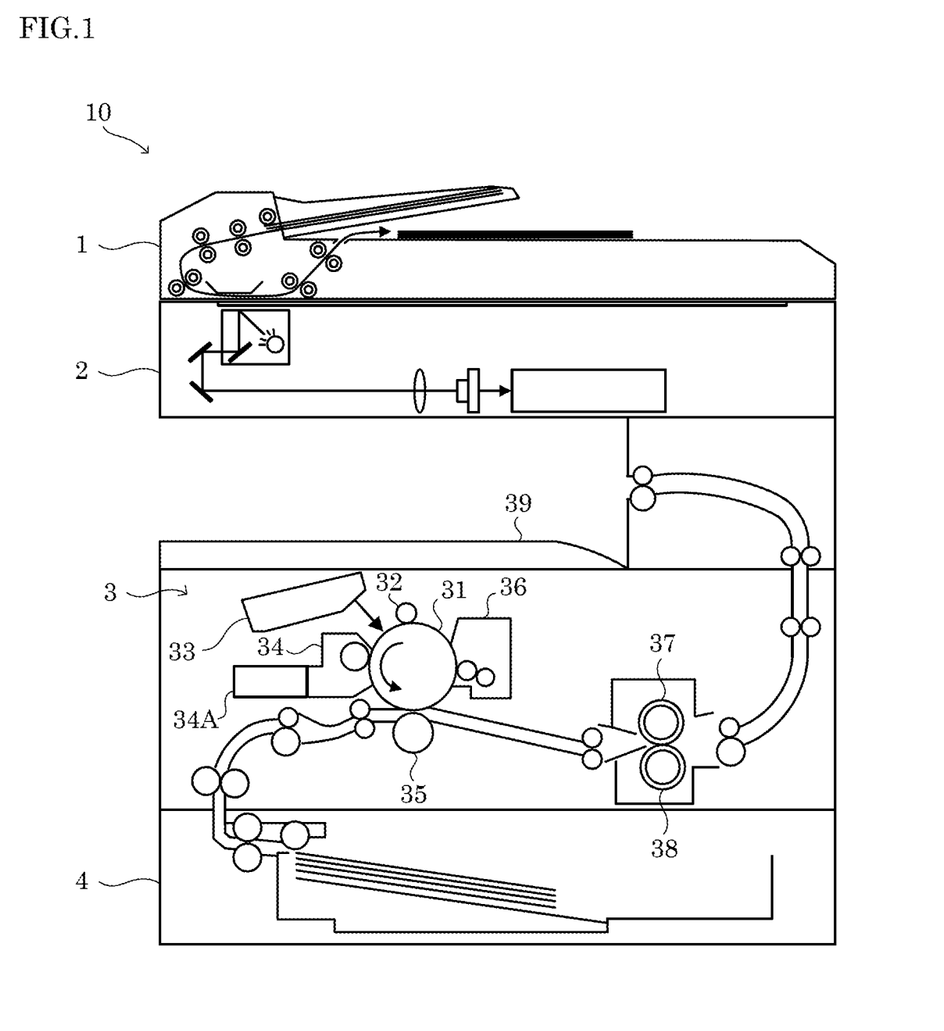
FIG. 1 is a diagram showing a configuration of an image forming apparatus according to an embodiment of the present disclosure.
Figure 2:
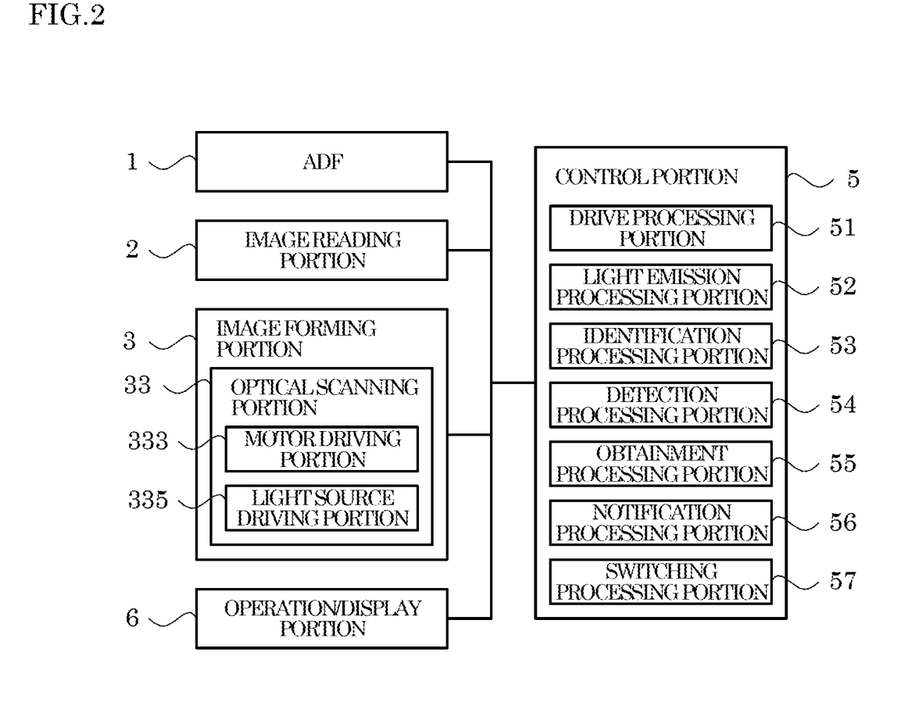
FIG. 2 is a block diagram showing a system configuration of the image forming apparatus according to the embodiment of the present disclosure.

As shown in FIG. 1 and FIG. 2, the image forming apparatus 10 includes an ADF 1, an image reading portion 2, an image forming portion 3, a sheet feed portion 4, a control portion 5, and an operation/display portion 6.

The ADF 1 is an automatic document feeding device that includes a document sheet setting portion, a plurality of conveyance rollers, a document sheet pressing, and a sheet discharge portion, and conveys a document sheet so that it is read by the image reading portion 2. The image reading portion 2 includes a document sheet table, a light source, a plurality of mirrors, an optical lens, and a CCD (Charge Coupled Device), and is configured to read image data from a document sheet.

The image forming portion 3 is configured to execute an image forming process (a print process) in which to form an image by the electrophotographic system based on image data read by the image reading portion 2, or image data input from an external information processing apparatus such as a personal computer. Specifically, as shown in FIG. 1, the image forming portion 3 includes a photoconductor drum 31, a charging equipment 32, an optical scanning portion 33, a developing equipment 34, a transfer roller 35, a cleaning device 36, a fixing roller 37, a pressure roller 38, and a sheet discharge tray 39.

The sheet feed portion 4 includes a sheet feed cassette and a plurality of conveyance rollers, and supplies sheets stored in the sheet feed cassette, to the image forming portion 3 one by one. It is noted that the sheet is a sheet-like material such as a sheet of paper, a sheet of coated paper, a postcard, an envelope, or an OHP sheet.

In the image forming portion 3, an image is formed in the following procedure on a sheet supplied from the sheet feed portion 4, and the sheet with the image formed thereon is discharged to the sheet discharge tray 39.

First, the charging equipment 32 uniformly charges the surface of the photoconductor drum 31 to a certain potential. Next, the optical scanning portion 33 irradiates light on the surface of the photoconductor drum 31 based on the image data. This causes an electrostatic latent image corresponding to the image data to be formed on the surface of the photoconductor drum 31. The electrostatic latent image on the photoconductor drum 31 is developed (visualized) as a toner image by the developing equipment 34. It is noted that toner (developer) is replenished to the developing equipment 34 from a toner container 34A that is attached to the image forming portion 3 in a detachable manner.

Subsequently, the toner image formed on the photoconductor drum 31 is transferred to the sheet by the transfer roller 35. Thereafter, the sheet is passed through between the fixing roller 37 and the pressure roller 38, during which the sheet is heated by the fixing roller 37, and the toner image transferred to the sheet is fused and fixed to the sheet. It is noted that the toner that has remained on the surface of the photoconductor drum 31 is removed by the cleaning device 36.

The control portion 5 includes control equipment such as CPU, ROM, RAM, and EEPROM that are not shown. The CPU is a processor that executes various calculation processes. The ROM is a nonvolatile storage portion in which various information such as control programs for causing the CPU to execute various processes are stored in advance. The RAM is a volatile storage medium, and is used as a temporary storage memory (working area) for the various processes executed by the CPU. The EEPROM is a nonvolatile storage medium. In the control portion 5, the CPU executes the various control programs stored in advance in the ROM. This causes the image forming apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image forming apparatus 10.

The operation/display portion 6 includes a display portion and an operation portion, wherein the display portion includes a liquid crystal display and LEDs, and displays various types of information in response to control instructions from the control portion 5, and the operation portion is, for example, operation keys or a touch panel that inputs various types of information to the control portion 5 in response to user operations.

[Configuration of Optical Scanning Portion 33]

Figure 3:
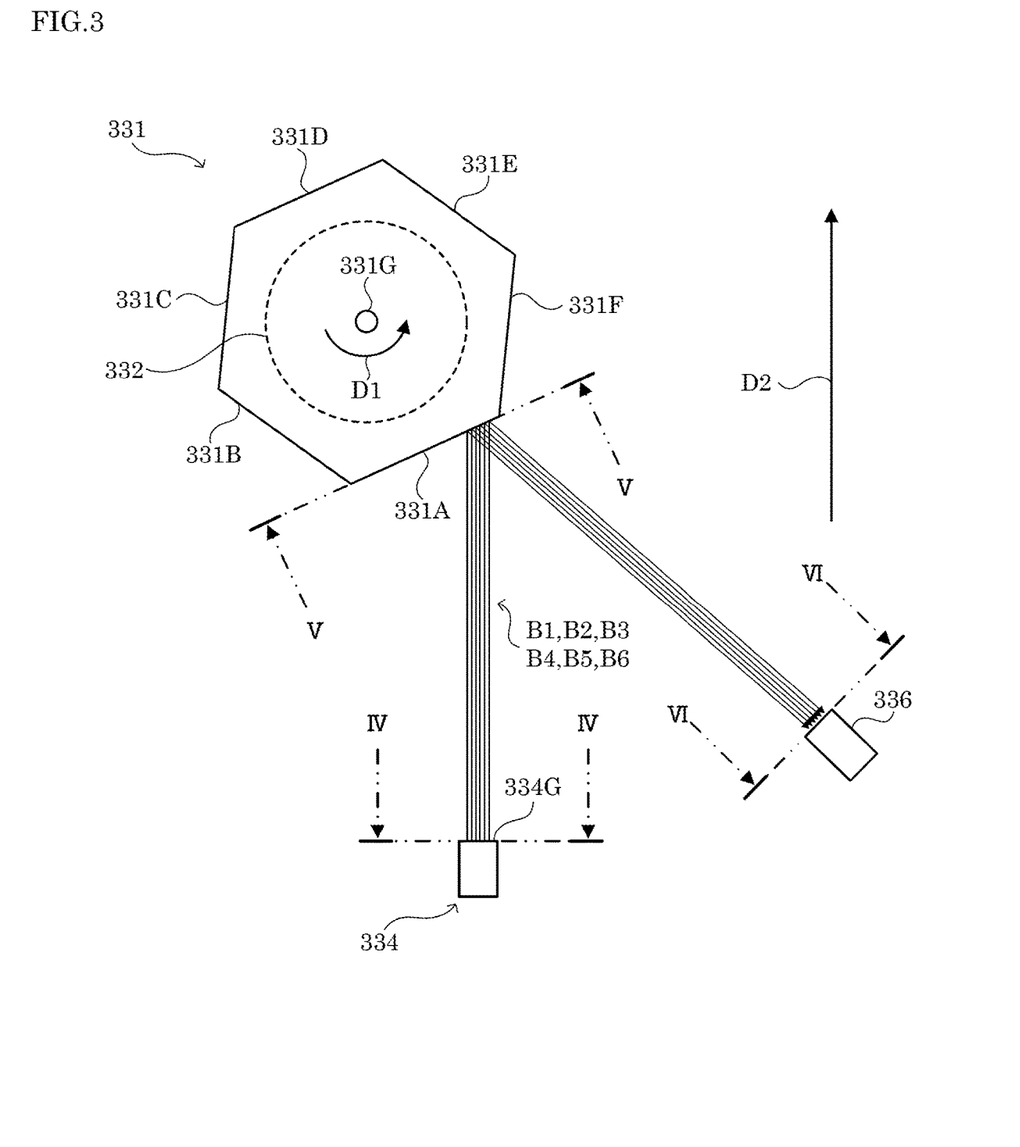
FIG. 3 is a diagram showing a configuration of an optical scanning portion of the image forming apparatus according to the embodiment of the present disclosure.
Figure 4:
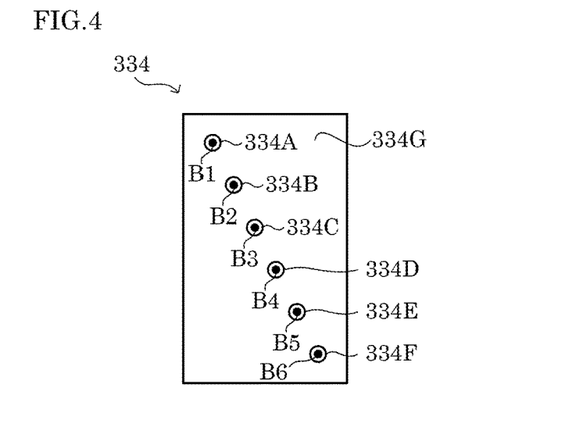
FIG. 4 is a diagram showing a configuration of a light emitting portion of the image forming apparatus according to the embodiment of the present disclosure.
Figure 5:
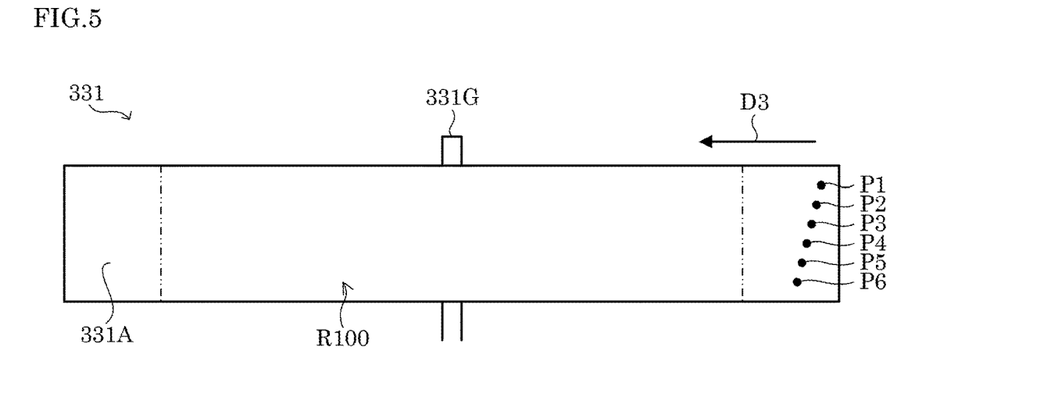
FIG. 5 is a diagram showing a reflection surface of the image forming apparatus according to the embodiment of the present disclosure.
Figure 6:
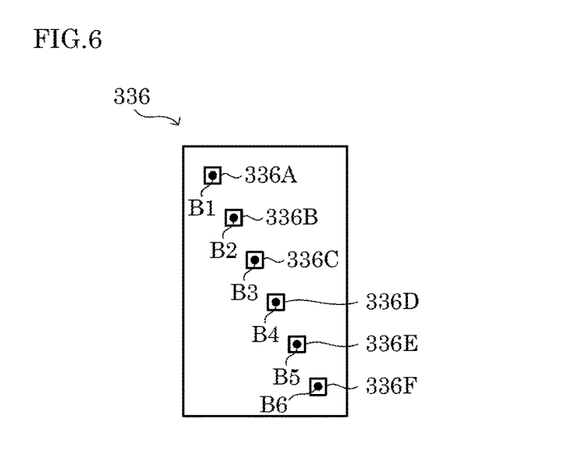
FIG. 6 is a diagram showing a light receiving portion of the image forming apparatus according to the embodiment of the present disclosure.
Figure 7:
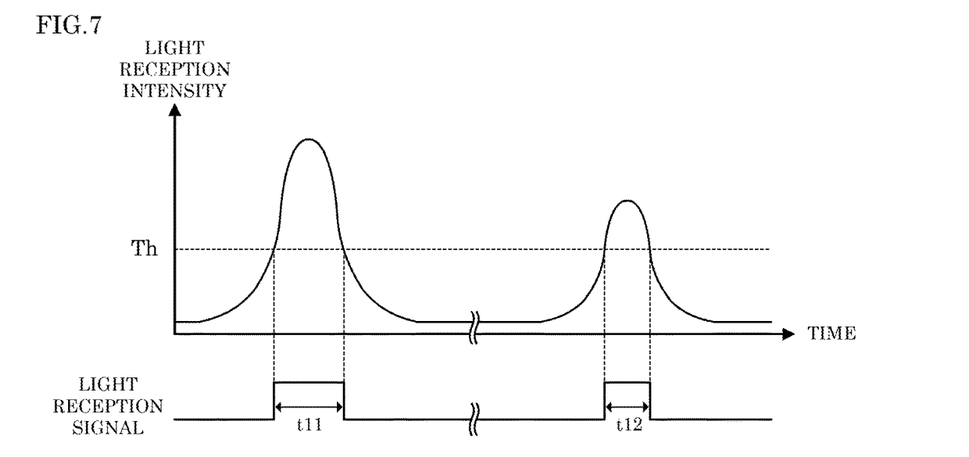
FIG. 7 is a diagram showing a light reception signal output from the light receiving portion of the image forming apparatus according to the embodiment of the present disclosure.
Figure 8:
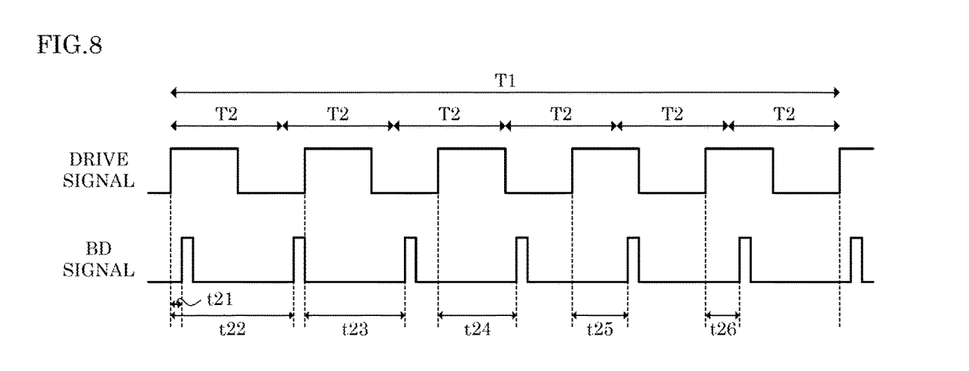
FIG. 8 is a diagram showing a relationship between a drive signal and a BD signal in the image forming apparatus according to the embodiment of the present disclosure.

Next, the optical scanning portion 33 of the image forming portion 3 is described with reference to FIG. 2 to FIG. 6. It is noted that FIG. 3 is a diagram conceptually showing an arrangement of structural elements and light paths in the optical scanning portion 33. In addition, FIG. 4 is a figure viewed from the arrow direction of the IV-IV line of FIG. 3, FIG. 5 is a figure viewed from the arrow direction of the V-V line of FIG. 3, and FIG. 6 is a figure viewed from the arrow direction of the VI-VI line of FIG. 3. FIG. 7 is a diagram showing a relationship between the light reception intensity of light beams received by light receiving elements 336A to 336F of a light receiving portion 336 and a light reception signal output from the light receiving elements 336A to 336F. FIG. 8 is a diagram showing a relationship between a drive signal input to a motor driving portion 333 and a light reception signal output from the light receiving element 336F (hereinafter, the light reception signal is referred to as a "BD signal"). It is noted that in FIG. 5, a latent image formation region R100 is indicated by two-dot chain lines.

The optical scanning portion 33 forms, on the photoconductor drum 31, an electrostatic latent image corresponding to the image data. Specifically, as shown in FIG. 2 and FIG. 3, the optical scanning portion 33 includes a polygon mirror 331, a motor 332, a motor driving portion 333, a light emitting portion 334, a light source driving portion 335, and a light receiving portion 336.

The polygon mirror 331 is configured to rotate at a high speed around a rotation shaft 331G as shown in FIG. 3, and scans light beams B1 to B6 that are incident from the light emitting portion 334. For example, the polygon mirror 331 is regular hexagonal in a plan view, and includes reflection surfaces 331A to 331F that reflect the light beams B1 to B6 incident from the light emitting portion 334. Here, the polygon mirror 331 is an example of the rotary polygon mirror of the present disclosure.

The motor 332 rotates the polygon mirror 331. For example, the motor 332 is a brushless motor. For example, the motor 332 rotates the polygon mirror 331 in a rotation direction D1 shown in FIG. 3. This causes the polygon mirror 331 to scan, in a main scanning direction D2 shown in FIG. 3, the light beams B1 to B6 that have been emitted from the light emitting portion 334 and reflected on the reflection surfaces 331A to 331F. In addition, the motor 332 rotates the polygon mirror 331 in a predetermined rotation cycle T1 (see FIG. 8). This causes the polygon mirror 331 to scan, in a scanning cycle T2 (see FIG. 8) that is one sixth of the rotation cycle T1, the light beams B1 to B6 that have been emitted from the light emitting portion 334 and reflected on the reflection surfaces 331A to 331F. It is noted that the light beams B1 to B6 scanned by the polygon mirror 331 pass through an optical system (not shown) including, for example, a reflection mirror and a scanning lens such as an fθ lens, and irradiate the photoconductor drum 31.

The motor driving portion 333 is a drive circuit that rotates the motor 332 by supplying a drive current to the motor 332. For example, the motor driving portion 333 rotates the motor 332 at a speed corresponding to a frequency of the drive signal (see FIG. 8) that is input from the control portion 5. For example, in the image forming apparatus 10, as shown in FIG. 8, five cycles of the drive signal correspond to the rotation cycle T1. For example, the motor driving portion 333 rotates the motor 332 at a speed that corresponds to the frequency of the drive signal, by performing a PLL control based on the drive signal and a detection signal output from a pulse encoder (not shown) that is configured to detect the number of rotations of the motor 332.

The light emitting portion 334 emits the light beams B1 to B6 toward the reflection surfaces 331A to 331F of the polygon mirror 331. For example, as shown in FIG. 4, the light emitting portion 334 is a semiconductor laser device of a multi-beam system and includes light emitters 334A to 334F. As shown in FIG. 4, the light emitter 334A emits a light beam B1, and the light emitter 334B emits a light beam B2. In addition, the light emitter 334C emits a light beam B3, and the light emitter 334D emits a light beam B4. Furthermore, the light emitter 334E emits a light beam B5, and the light emitter 334F emits a light beam B6. It is noted that the number of light emitters provided in the light emitting portion 334 may be in a range of two to five, or may be seven or more. Here, the light emitters 334A to 334F are an example of the plurality of light sources of the present disclosure.

The light emitters 334A to 334F emit the light beams B1 to B6 that are separated from each other in the axis direction of a rotation shaft 331G of the polygon mirror 331. For example, the light emitters 334A to 334F are arranged on a surface 334G of the light emitting portion 334 that faces the polygon mirror 331, so as to be separated from each other in the axis direction (the up-down direction in FIG. 4) of the rotation shaft 331G of the polygon mirror 331. In addition, the light emitters 334A to 334F are arranged on the surface 334G of the light emitting portion 334 that faces the polygon mirror 331, so as to be separated from each other in a direction (the left-right direction in FIG. 4) perpendicular to the axis direction of the rotation shaft 331G.

For example, the light beam B1 emitted from the light emitter 334A is, as shown in FIG. 5, irradiated on an irradiation position P1 of the reflection surface 331A and reflected toward the light receiving portion 336. Similarly, the light beams B2 to B6 respectively emitted from the light emitters 334B to 334F are, as shown in FIG. 5, irradiated on irradiation positions P2 to P6 of the reflection surface 331A and reflected thereon toward the light receiving portion 336. When the polygon mirror 331 rotates in the rotation direction D1, the light beams B1 to B6 reflected on the reflection surface 331A are scanned in the main scanning direction D2, and the irradiation positions P2 to P6 move in a movement direction D3 shown in FIG. 5.

The light source driving portion 335 is a drive circuit that causes the light emitters 334A to 334F to emit light beams by supplying a drive current to the light emitters 334A to 334F. For example, the light source driving portion 335 causes each of the light emitters 334A to 334F to emit a light beam with a light emission amount set by a control signal input from the control portion 5.

In addition, the light source driving portion 335 causes each of the light emitters 334A to 334F to emit a light beam corresponding to the image data, in accordance with a pulse signal input from the control portion 5, the pulse signal having been modified based on the image data. Specifically, the light source driving portion 335 causes the light emitters 334A to 334F to emit light beams corresponding to the image data while the irradiation positions P1 to P6 shown in FIG. 5 are moving in the latent image formation region R100. The light beams corresponding to the image data emitted from the light emitters 334A to 334F are scanned on the photoconductor drum 31 by the polygon mirror 331. With this operation, an electrostatic latent image corresponding to the image data is formed on the photoconductor drum 31.

The light receiving portion 336 is provided at a predetermined position on a scanning path of the light beams B1 to B6 scanned by the polygon mirror 331, and detects the light beams B1 to B6 reflected from the reflection surfaces 331A to 331F of the polygon mirror 331. For example, the light receiving portion 336 is provided at a position where it can receive the light beams B1 to B6 that have been reflected on the irradiation positions P1 to P6 of the reflection surface 331A shown in FIG. 5. As shown in FIG. 6, the light receiving portion 336 includes the plurality of light receiving elements 336A to 336F that respectively correspond to the light beams B1 to B6. As shown in FIG. 6, the light receiving element 336A is provided in correspondence with the light beam B1, and the light receiving element 336B is provided in correspondence with the light beam B2. In addition, the light receiving element 336C is provided in correspondence with the light beam B3, and the light receiving element 336D is provided in correspondence with the light beam B4. Furthermore, the light receiving element 336E is provided in correspondence with the light beam B5, and the light receiving element 336F is provided in correspondence with the light beam B6.

As shown in FIG. 7, each of the light receiving elements 336A to 336F outputs a light reception signal upon receiving a light beam whose intensity is equal to or greater than a predetermined intensity Th. The light reception signals output from the light receiving elements 336A to 336F are input to the control portion 5. For example, in the image forming apparatus 10, a timing at which the irradiation positions P1 to P6 shown in FIG. 5 enter the latent image formation region R100, namely, a timing to write the electrostatic latent image is determined based on the timing at which the light receiving element 336F outputs the light reception signal (BD signal).

Meanwhile, the reflection surfaces 331A to 331F of the polygon mirror 331 may be stained. In that case, the reflectance of the reflection surfaces 331A to 331F is reduced, and thereby the light amount of the light beams B1 to B6 that are scanned by the polygon mirror 331 is reduced. As measures against this, the light emission amount of the light emitters 334A to 334F may be adjusted based on the light amount of the light beams B1 to B6 detected by the light receiving portion 336.

However, some areas of the reflection surfaces 331A to 331F of the polygon mirror 331 are easy to stain, and others are difficult to stain. As a result, in a case where the light emission amount of the light emitters 334A to 334F is adjusted based on the light amount of the light beams B1 to B6 detected by the light receiving portion 336, when the light emitters 334A to 334F emit light beams with the same light emission amount in the scanning cycle T2 in which the polygon mirror 331 scans the light beams B1 to B6, the light amount of the light beams B1 to B6 scanned by the polygon mirror 331 is varied.

Figure 9:
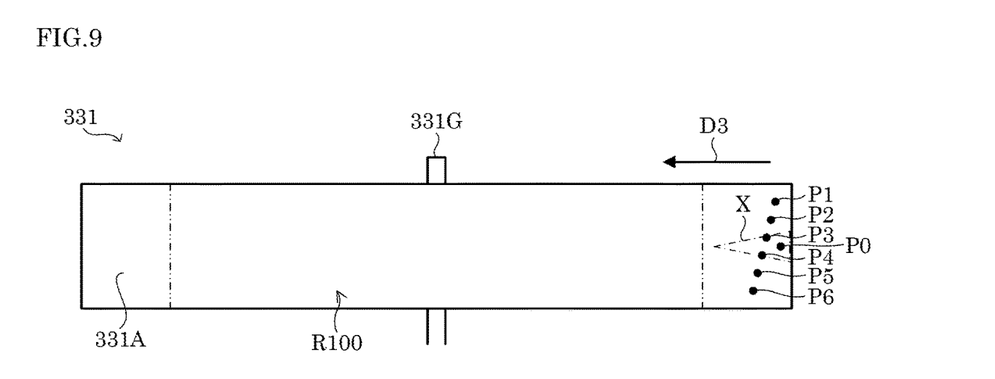
FIG. 9 is a diagram showing a stain produced on the reflection surface of the image forming apparatus according to the embodiment of the present disclosure.
Figure 10:
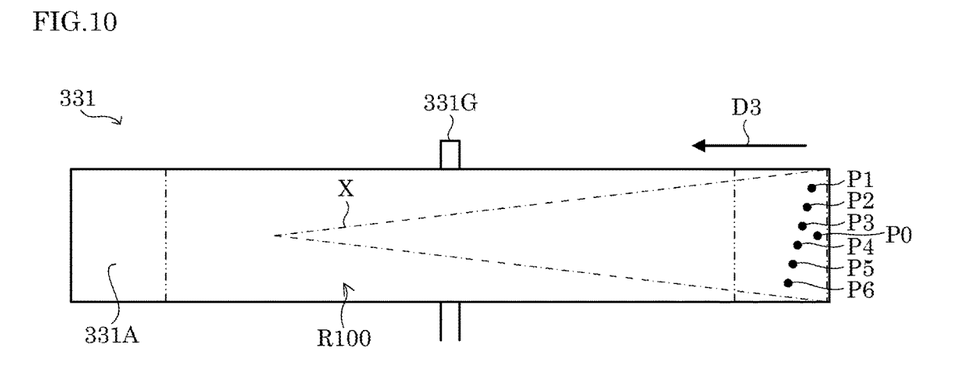
FIG. 10 is a diagram showing a stain produced on the reflection surface of the image forming apparatus according to the embodiment of the present disclosure.

Here, FIG. 9 and FIG. 10 show an example of a stain produced on the reflection surface 331A of the polygon mirror 331. It is noted that FIG. 9 is a diagram showing a state of the reflection surface 331A shown in FIG. 5 in an initial use stage of the image forming apparatus 10. In addition, FIG. 10 is a diagram showing a state of the reflection surface 331A shown in FIG. 5 after the image forming apparatus 10 is used for a long time period. It is noted that in FIG. 9 and FIG. 10, a stain X is represented as an area enclosed by a one-dot chain line. The following describes the reflection surface 331A as an example, but the description also applies to the reflection surfaces 331B to 331F.

When the polygon mirror 331 rotates in the rotation direction D1, an air flow is generated at a corner portion (a boundary between the reflection surface 331A and the reflection surface 331F) on the outer circumference of the polygon mirror 331. This causes surrounding air to be blown to an adhesion position P0 (see FIG. 9) that is located at a center in the axis direction of the rotation shaft 331G in an end portion of the reflection surface 331A on the upstream side in the movement direction D3. As a result, foreign matter such as dust contained in the air adheres to the adhesion position P0 and produces the stain X. In addition, as the number of rotations of the polygon mirror 331 increases, the stain X adhesion area in the reflection surface 331A is expanded. Specifically, as shown in FIG. 9 and FIG. 10, the stain X adhesion area in the reflection surface 331A is expanded in the movement direction D3 and in the axis direction centered around the adhesion position P0.

The image forming apparatus 10 according to the embodiment of the present disclosure, as described in the following, is configured to suppress variation in the light amount of the light beams B1 to B6 scanned by the polygon mirror 331.

Figure 13:
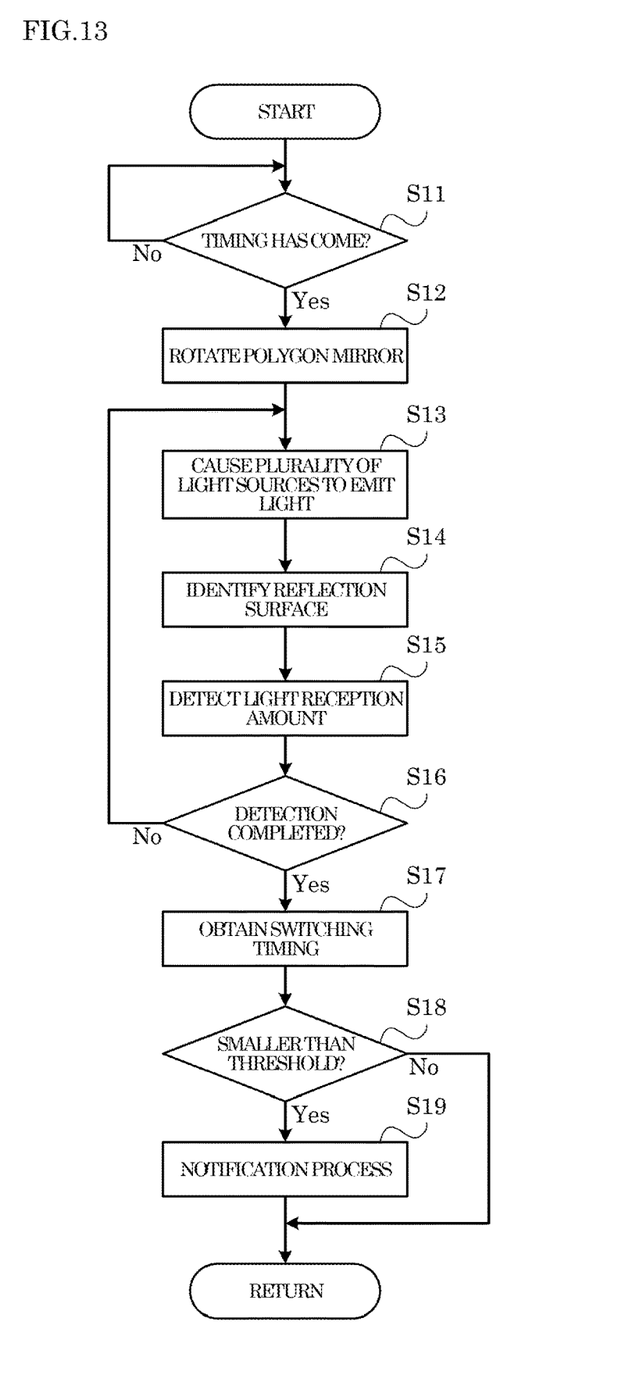
FIG. 13 is a flowchart showing an example of a timing obtaining process executed in the image forming apparatus according to the embodiment of the present disclosure.
Figure 14:
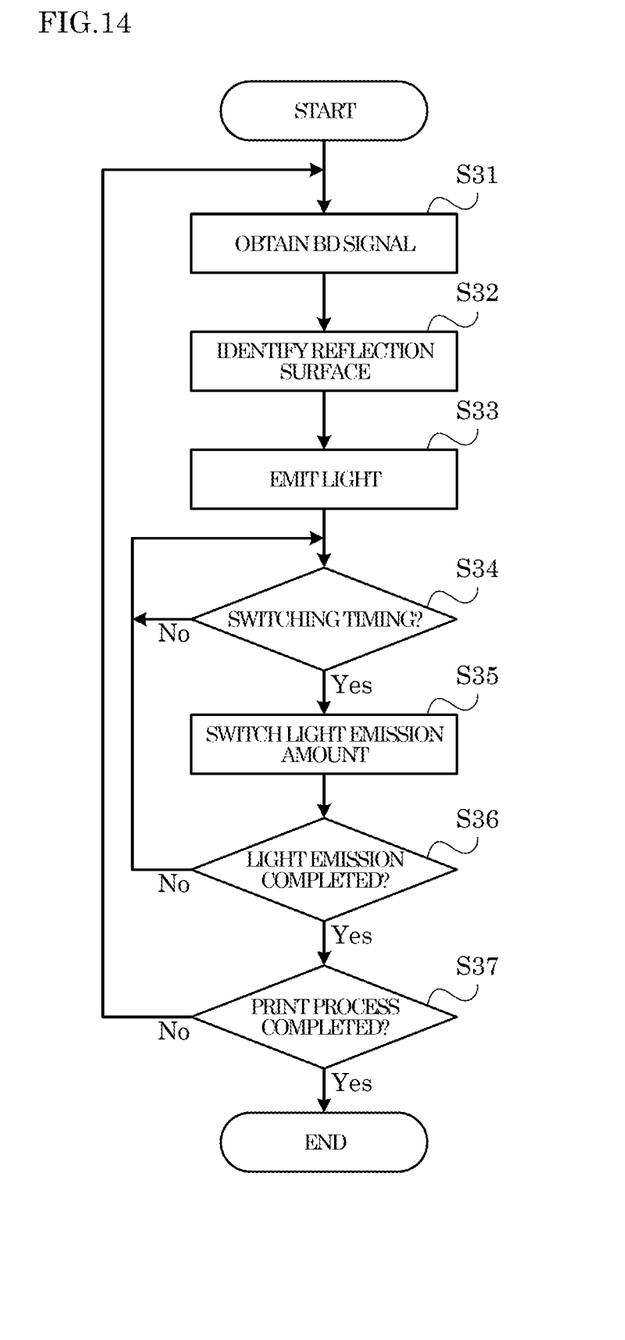
FIG. 14 is a flowchart showing an example of a latent image forming process executed in the image forming apparatus according to the embodiment of the present disclosure.

Specifically, a latent image forming program is stored in advance in the ROM of the control portion 5, wherein, when executed, the latent image forming program causes the CPU to execute a timing obtaining process (see the flowchart of FIG. 13) and a latent image forming process (see the flowchart of FIG. 14). It is noted that the latent image forming program may be recorded on a computer-readable recording medium such as a CD, a DVD, a HDD, or a flash memory, and may be installed from the recording medium to a storage medium such as the EEPROM of the control portion 5.

The control portion 5, as shown in FIG. 2, includes a drive processing portion 51, a light emission processing portion 52, an identification processing portion 53, a detection processing portion 54, an obtainment processing portion 55, a notification processing portion 56, and a switching processing portion 57. Specifically, the control portion 5 executes the latent image forming program stored in the ROM by using the CPU. This causes the control portion 5 to function as the drive processing portion 51, the light emission processing portion 52, the identification processing portion 53, the detection processing portion 54, the obtainment processing portion 55, the notification processing portion 56, and the switching processing portion 57. Here, a device including the optical scanning portion 33 and the control portion 5 is an example of the optical scanning device of the present disclosure.

The drive processing portion 51 rotates the polygon mirror 331 when a predetermined timing has come. For example, at a timing when an instruction to execute a print process has been input, the drive processing portion 51 inputs the drive signal to the motor driving portion 333 to cause the motor driving portion 333 to drive the motor 332. In addition, the drive processing portion 51 may rotate the polygon mirror 331 at a timing when the image forming apparatus 10 has been powered on, or at a timing when the image forming apparatus 10 has returned from a sleep state to a normal operation state, wherein in the sleep state, a part of the functions of the image forming apparatus 10 is stopped. Here, the above-described timing is an example of the predetermined timing of the present disclosure.

The light emission processing portion 52, when the polygon mirror 331 has been rotated by the drive processing portion 51, causes each of the light emitters 334A to 334F to emit a light beam based on the image data with a predetermined specific light amount that is more intense than a reference light amount at the time of emission of light. Specifically, the light emission processing portion 52 inputs the control signal to the light source driving portion 335 so that the light source driving portion 335 causes each of the light emitters 334A to 334F to emit a light beam with the specific light amount. For example, the light emission processing portion 52 causes each of the light emitters 334A to 334F to emit a light beam at an interval of a predetermined specific time period that includes a timing at which the light beams scanned by the polygon mirror 331 are incident on the light receiving portion 336 in the scanning cycle T2.

The identification processing portion 53 identifies a reflection surface of the polygon mirror 331 that reflects the light beams B1 to B6 emitted from the light emitters 334A to 334F. For example, the identification processing portion 53 identifies the reflection surface in each scanning cycle T2 based on the drive signal and the BD signal.

Specifically, as shown in FIG. 8, the identification processing portion 53 identifies the reflection surface based on time differences t21 to t26 each of which is a difference between a timing of the rising edge of the drive signal and a timing of the rising edge of the BD signal. That is, in the image forming apparatus 10, five cycles of the drive signal correspond to the rotation cycle T1. As a result, the timing of the rising edge of the drive signal is different in each of six scanning periods T2 of one rotation cycle T1, wherein the scanning cycle T2 is one sixth of the rotation cycle T1. Accordingly, by obtaining the timing of the rising edge of the drive signal in a scanning cycle T2, it is possible to identify a reflection surface corresponding to the scanning cycle T2.

The detection processing portion 54, on the scanning path of the light beams scanned by the polygon mirror 331, detects the light amount of each of the light beams B1 to B6 emitted from the light emitters 334A to 334F and reflected on the reflection surfaces 331A to 331F. Specifically, the detection processing portion 54 detects the light amount of each of the light beams B1 to B6 based on the output time period of the light reception signal output from each of the light receiving elements 336A to 336F of the light receiving portion 336. Here, the light receiving elements 336A to 336F of the light receiving portion 336 and the detection processing portion 54 are an example of the light detecting portion of the present disclosure.

For example, in the image forming apparatus 10, a storage medium such as the EEPROM stores, in advance, table data that shows correspondence between output time periods of light reception signals from the light receiving elements 336A to 336F and light reception amounts at the light receiving elements 336A to 336F. By referring to the table data, the detection processing portion 54 detects the light reception amount at each of the light receiving elements 336A to 336F that corresponds to the output time period of the light reception signal output from each of the light receiving elements 336A to 336F.

For example, as shown in FIG. 7, when the output time period of the light reception signal from a light receiving element of the light receiving portion 336 is an output time period t11, the detection processing portion 54 refers to the table data and detects a light reception amount corresponding to the output time period t11. In addition, as shown in FIG. 7, when the output time period of the light reception signal from a light receiving element of the light receiving portion 336 is an output time period t12, the detection processing portion 54 refers to the table data and detects a light reception amount corresponding to the output time period t12.

It is noted that in a case where a light reception signal having a voltage or current corresponding to the light reception amount is output from each of the light receiving elements 336A to 336F, the detection processing portion 54 detects the light reception amount at each of the light receiving elements 336A to 336F based on the voltage or the current of the light reception signal.

The obtainment processing portion 55 obtains a switching timing to switch the light emission amount of each of the light emitters 334A to 334F in the scanning cycle T2 for each of the reflection surfaces, based on an average value of light amounts of each of the light beams B1 to B6 detected by the detection processing portion 54 in a predetermined number of scanning periods T2 for each reflection surface identified by the identification processing portion 53. Specifically, when the light emitters 334A to 334F are caused to emit light beams by the light emission processing portion 52, the obtainment processing portion 55 obtains the switching timing in the scanning cycle T2, based on the light amount of each of the light beams B1 to B6 detected by the detection processing portion 54.

For example, the obtainment processing portion 55 calculates an average value of light amounts of each of the light beams B1 to B6 detected by the detection processing portion 54 in a plurality of scanning periods T2 corresponding to the reflection surface 331A. For example, the obtainment processing portion 55 calculates an average value of light amounts of each of the light beams B1 to B6 detected by the detection processing portion 54 in 10 (ten) scanning periods T2 corresponding to the reflection surface 331A.

The obtainment processing portion 55 identifies an adhesion state of the stain X on the reflection surface 331A of the current time, based on the calculated average value of the light amount of each of the light beams B1 to B6. For example, the obtainment processing portion 55 identifies an adhesion state of the stain X of the current time, from among ten levels of the adhesion state of the stain X that have been set in advance based on presence/absence of a reduction in the light amount of reflected light beam and the reduction amount at each of the irradiation positions P1 to P6 on the reflection surface 331A shown in FIG. 5. For example, the adhesion state of the stain X shown in FIG. 9 corresponds to the second level, and the adhesion state of the stain X shown in FIG. 10 corresponds to the eighth level.

Figure 11:
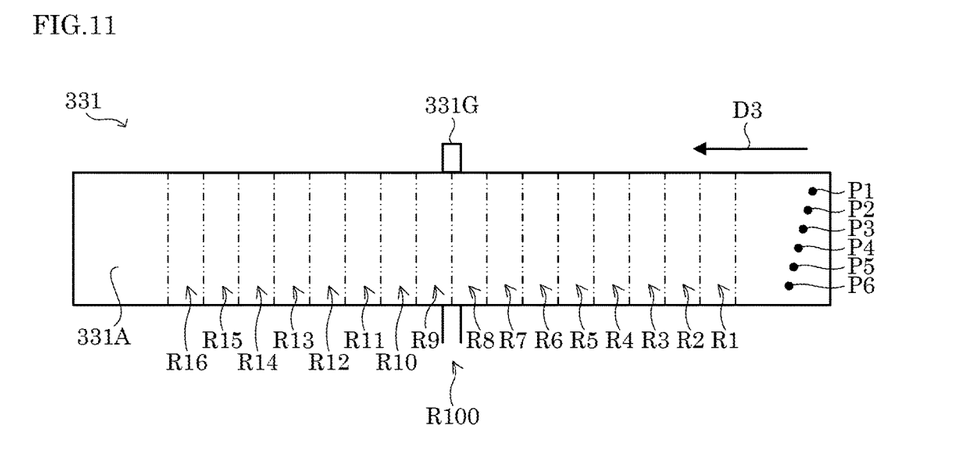
FIG. 11 is a diagram showing division regions set in the reflection surface of the image forming apparatus according to the embodiment of the present disclosure.

The obtainment processing portion 55 obtains a switching timing that corresponds to the identified adhesion state of the stain X on the reflection surface 331A of the current time. For example, in the image forming apparatus 10, as shown in FIG. 11, division regions R1 to R16 are set in the latent image formation region R100 of the reflection surface 331A, the division regions R1 to R16 having the same width in the movement direction D3. In addition, in the image forming apparatus 10, light amount correction data is stored in a storage medium such as the EEPROM, the light amount correction data defining a correction value for each level of the adhesion state of the stain X on the reflection surface 331A, for correction of the light emission amount of each of the light emitters 334A to 334F for each of the division regions R1 to R16. The obtainment processing portion 55 obtains the switching timing in the scanning cycle T2 for the reflection surface 331A, by obtaining light amount correction data corresponding to the identified adhesion state of the stain X on the reflection surface 331A of the current time.

Figure 12:
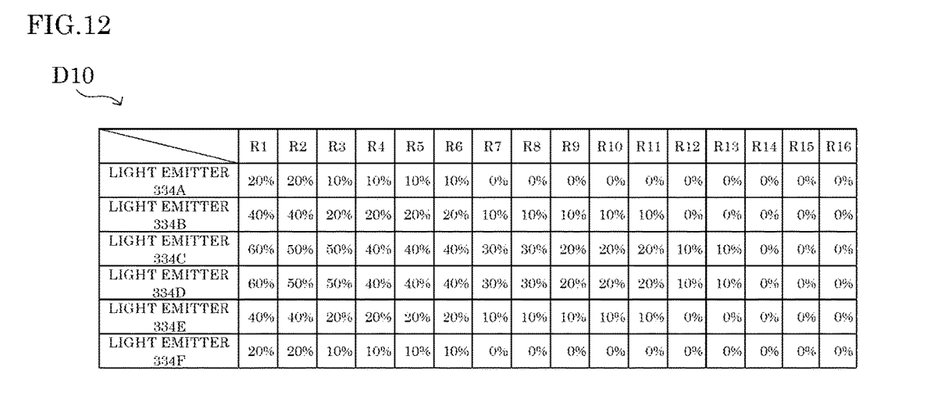
FIG. 12 is a diagram showing a configuration of light amount correction data used in the image forming apparatus according to the embodiment of the present disclosure.

FIG. 12 shows an example of the light amount correction data. It is noted that light amount correction data D10 shown in FIG. 12 corresponds to the adhesion state of the stain X shown in FIG. 10. In addition, in FIG. 12, the correction value for correction of the light emission amount of each of the light emitters 334A to 334F for each of the division regions R1 to R16 is represented by the increase rate of the light emission amount to the reference light amount.

Similarly, the obtainment processing portion 55 obtains the switching timing in the scanning cycle T2 for each of the reflection surfaces 331B to 331F, by obtaining the light amount correction data corresponding to each of the reflection surfaces 331B to 331F.

It is noted that the obtainment processing portion 55 may obtain the switching timing in the scanning cycle T2 for each of the reflection surfaces, based on the light amounts of each of the light beams B1 to B6 detected by the detection processing portion 54 for each reflection surface identified by the identification processing portion 53.

In addition, as another embodiment, the image forming apparatus 10 may not include the identification processing portion 53. In this case, the obtainment processing portion 55 may obtain the switching timing in the scanning cycle T2, based on an average value of light amounts of each of the light beams B1 to B6 detected by the detection processing portion 54 in a plurality of scanning periods T2. In addition, the obtainment processing portion 55 may obtain the switching timing in the scanning cycle T2 based on the light amount of each of the light beams B1 to B6 detected by the detection processing portion 54.

The notification processing portion 56, when any of the light amounts of the light beams B1 to B6 detected by the detection processing portion 54 is smaller than a predetermined threshold, notifies that cleaning of the reflection surface is necessary. For example, the notification processing portion 56 displays, on the operation/display portion 6, a message indicating that cleaning of the reflection surface is necessary.

It is noted that the notification processing portion 56 may make the notification by emitting an alarm sound, changing the color of the display portion, or changing the illuminance of the display portion, instead of or together with the display of the message on the operation/display portion 6. In addition, the notification processing portion 56 may send an e-mail including the message to a predetermined destination such as a maintenance worker of the image forming apparatus 10.

The switching processing portion 57 switches the light emission amount of each of the light emitters 334A to 334F based on the switching timing obtained by the obtainment processing portion 55. For example, the switching processing portion 57 causes the light source driving portion 335 to switch the light emission amount of each of the light emitters 334A to 334F based on the light amount correction data corresponding to each of the reflection surfaces 331A to 331F.

[Timing Obtaining Process]

In the following, with reference to FIG. 13, a description is given of an example of the procedure of the timing obtaining process executed by the control portion 5 in the image forming apparatus 10, and an example of the procedure of the optical scanning method of the present disclosure. Here, steps S11, S12, . . . represent numbers assigned to the processing procedures (steps) executed by the control portion 5.

<Step S11>

First, in step S11, the control portion 5 determines whether or not the timing has come. For example, when an instruction to execute a print process has been input, the control portion 5 determines that the timing has come. It is noted that the control portion 5 may determine that the timing has come when the image forming apparatus 10 has been powered on, or when the image forming apparatus 10 has returned from the sleep state to the normal operation state.

Here, upon determining that the timing has come (Yes side at S11), the control portion 5 moves the process to step S12. On the other hand, upon determining that the timing has not come (No side at S11), the control portion 5 waits at step S11 for the timing to come.

<Step S12>

In step S12, the control portion 5 rotates the polygon mirror 331. Specifically, the control portion 5 causes the motor driving portion 333 to drive the motor 332 by inputting the drive signal to the motor driving portion 333. Here, the processes of steps S11 and S12 are executed by the drive processing portion 51 of the control portion 5.

<Step S13>

In step S13, the control portion 5 causes each of the light emitters 334A to 334F to emit a light beam with the specific light amount. Specifically, the control portion 5 causes each of the light emitters 334A to 334F to emit a light beam with the specific light amount by inputting the control signal to the light source driving portion 335. For example, the control portion 5 causes each of the light emitters 334A to 334F to emit a light beam at an interval of the specific time period. For example, the control portion 5 causes each of the light emitters 334A to 334F to emit a light beam at an interval of the specific time period in the scanning cycle T2. Here, the process of step S13 is executed by the light emission processing portion 52 of the control portion 5.

It is noted that in step S13, the control portion 5 may cause each of the light emitters 334A to 334F to emit a light beam with the reference light amount. In the case where, in step S13, each of the light emitters 334A to 334F emits a light beam with the specific amount that is more intense than the reference light amount, the identification accuracy of the adhesion state of the stain X on each reflection surface of the current time in step S17 is increased.

<Step S14>

In step S14, the control portion 5 identifies a reflection surface of the polygon mirror 331 reflecting the light beams B1 to B6 emitted from the light emitters 334A to 334F. For example, the control portion 5 identifies the reflection surface based on the time difference between the timing of the rising edge of the drive signal and the timing of the rising edge of the BD signal. Here, the process of step S14 is executed by the identification processing portion 53 of the control portion 5.

It is noted that the process of step S14 may be omitted. In the timing obtaining process, the execution of the process of step S14 makes it possible to obtain the switching timing in the scanning cycle T2 for each reflection surface.

<Step S15>

In step S15, the control portion 5 detects the light amount of each of the light beams B1 to B6 reflected on the reflection surface identified in step S14 and received by each of the light receiving elements 336A to 336F of the light receiving portion 336. For example, by referring to the table data, the control portion 5 detects light reception amounts at the light receiving elements 336A to 336F that correspond to output time periods of light reception signals from the light receiving elements 336A to 336F. Here, the process of step S15 is executed by the detection processing portion 54 of the control portion 5.

<Step S16>

In step S16, the control portion 5 determines whether or not the detection of the light amount of each of the light beams B1 to B6 by the light receiving portion 336 has ended. For example, the control portion 5 determines that the detection of the light amount of each of the light beams B1 to B6 by the light receiving portion 336 has ended when the process of step S15 has been executed a predetermined number of times for each of the reflection surfaces 331A to 331F of the polygon mirror 331.

Here, upon determining that the detection of the light amounts of each of the light beams B1 to B6 by the light receiving portion 336 has ended (Yes side at S16), the control portion 5 moves the process to step S17. On the other hand, upon determining that the detection of the light amount of each of the light beams B1 to B6 by the light receiving portion 336 has not ended (No side at S16), the control portion 5 moves the process to step S13.

It is noted that in the case where the process of step S14 is omitted, the control portion 5 may determine in step S16 that the detection of the light amount of each of the light beams B1 to B6 by the light receiving portion 336 has ended when the process of step S15 has been executed a predetermined number of times.

<Step S17>

In step S17, the control portion 5 obtains a switching timing for switching the light emission amount of each of the light emitters 334A to 334F in the scanning cycle T2 for each of the reflection surfaces, based on an average value of light amounts of each of the light beams B1 to B6 detected in step S15 a predetermined number of times for each reflection surface identified in step S14. Here, the process of step S17 is an example of the first step of the present disclosure, and is executed by the obtainment processing portion 55 of the control portion 5.

For example, the control portion 5 calculates an average value of light amounts of each of the light beams B1 to B6 detected in step S15 for each reflection surface identified in step S14. In addition, the control portion 5 identifies an adhesion state of the stain X for each reflection surface based on the calculated average value of light amounts of each of the light beams B1 to B6. Subsequently, the control portion 5 obtains the switching timing in the scanning cycle T2 for each reflection surface, by obtaining light amount correction data corresponding to the identified adhesion state of the stain X on each reflection surface of the current time.

For example, the control portion 5 stores the obtained light amount correction data for each reflection surface into the RAM or the EEPROM. The light amount correction data for each reflection surface stored in the RAM or the EEPROM in step S17 is used in the latent image forming process that is described below.

It is noted that, in step S17, the control portion 5 may obtain the switching timing in the scanning cycle T2 for each of the reflection surfaces, based on the light amount of each of the light beams B1 to B6 detected in step S15 for each reflection surface identified in step S14. In a case where the process of step S14 is omitted, the control portion 5, in step S17, may obtain the switching timing in the scanning cycle T2, based on an average value of light amounts of each of the light beams B1 to B6 detected in step S15 a predetermined number of times. In addition, in the case where the process of step S14 is omitted, the control portion 5, in step S17, may obtain the switching timing in the scanning cycle T2, based on the light amount of each of the light beams B1 to B6 detected in step S15.

<Step S18>

In step S18, the control portion 5 determines whether or not any of the light amounts of each of the light beams B1 to B6 detected in step S15 is smaller than a threshold.

Here, upon determining that any of the light amounts of each of the light beams B1 to B6 detected in step S15 is smaller than the threshold (Yes side at S18), the control portion 5 moves the process to step S19. On the other hand, upon determining that all of the light amounts of each of the light beams B1 to B6 detected in step S15 are equal to or larger than the threshold (No side at S18), the control portion 5 moves the process to step S11.

<Step S19>

In step S19, the control portion 5 notifies that cleaning of the reflection surface is necessary. For example, the control portion 5 displays, on the operation/display portion 6, a message indicating that cleaning of the reflection surface is necessary. Here, the processes of steps S18 and S19 are executed by the notification processing portion 56 of the control portion 5. This enables the user of the image forming apparatus 10 to recognize that cleaning of the reflection surface is necessary and respond to the notification by, for example, requesting a maintenance work or replacing the optical scanning portion 33 with a new one.

It is noted that the control portion 5 may send an e-mail including the message to a predetermined destination such as a maintenance worker of the image forming apparatus 10, instead of or together with the display of the message on the operation/display portion 6. This reduces the time and effort taken by the user to request a maintenance work.

[Latent Image Forming Process]

In the following, with reference to FIG. 14, a description is given of an example of the procedure of the latent image forming process executed by the control portion 5 in the image forming apparatus 10, and an example of the procedure of the optical scanning method of the present disclosure. It is noted that, in a case where the above-described timing is when an instruction to execute the print process has been input, the latent image forming process is executed after the timing obtaining process is completed. In addition, in a case where the above-described timing is not when an instruction to execute the print process has been input, the latent image forming process is executed when an instruction to execute the print process has been input.

<Step S31>

First, in step S31, the control portion 5 obtains the BD signal. For example, the control portion 5 obtains the BD signal by causing the light emitter 334F to emit a light beam with the reference light amount during the specific time period in the scanning cycle T2.

<Step S32>

In step S32, the control portion 5 identifies the reflection surface of the polygon mirror 331 that has reflected the light beam B6 emitted from the light emitter 334F, based on an obtainment timing at which the BD signal was obtained in step S31.

<Step S33>

In step S33, the control portion 5 causes the light emitters 334A to 334F to emit light beams corresponding to the image data, based on the obtainment timing at which the BD signal was obtained in step S31.

<Step S34>

In step S34, the control portion 5 determines whether or not the switching timing has come based on light amount correction data corresponding to the reflection surface identified in step S32, among light amount correction data corresponding to the reflection surfaces obtained in step S17 of the timing obtaining process.

Here, upon determining that the switching timing has come (Yes side at S34), the control portion 5 moves the process to step S35. On the other hand, upon determining that the switching timing has not come (No side at S34), the control portion 5 waits at step S34 for the switching timing to come.

<Step S35>

In step S35, the control portion 5 switches the light emission amount of each of the light emitters 334A to 334F based on the light amount correction data corresponding to the reflection surface identified in step S32. Here, the process of step S35 is an example of the second step of the present disclosure, and is executed by the switching processing portion 57 of the control portion 5.

\<Step S36\>

In step S36, the control portion 5 determines whether or not emitting of the light beams corresponding to the image data from the light emitters 334A to 334F to the reflection surface identified in step S32, has been completed.

Here, upon determining that emitting of the light beams corresponding to the image data from the light emitters 334A to 334F to the reflection surface identified in step S32 has been completed (Yes side at S36), the control portion 5 moves the process to step S37. On the other hand, upon determining that emitting of the light beams corresponding to the image data has not been completed (No side at S36), the control portion 5 moves the process to step S34.

\<Step S37\>

In step S37, the control portion 5 determines whether or not the print process has been completed.

Here, upon determining that the print process has been completed (Yes side at S37), the control portion 5 ends the latent image forming process. On the other hand, upon determining that the print process has been completed (No side at S37), the control portion 5 moves the process to step S31.

As described above, in the image forming apparatus 10, the switching timing of the light emission amount of each of the light emitters 334A to 334F in the scanning cycle T2 is obtained based on the light amount of each of the light beams B1 to B6 detected by the detection processing portion 54. In addition, based on the obtained switching timing, the light emission amount of each of the light emitters 334A to 334F is switched. This makes it possible to suppress variation in the light amount of the light beams B1 to B6 scanned by the polygon mirror 331.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An optical scanning device comprising:
a rotary polygon mirror having a reflection surface that reflects incident light and configured to scan, in a predetermined scanning cycle, the light reflected on the reflection surface;
a plurality of light sources configured to emit, toward the reflection surface, a plurality of light beams that are separated from each other in an axis direction of a rotation shaft of the rotary polygon mirror;
a light detecting portion configured to detect, on a light scanning path of the rotary polygon mirror, a light amount of each of the light beams emitted from the light sources and reflected on the reflection surface;
an obtainment processing portion configured to obtain a switching timing to switch a light emission amount of each of the light sources in the scanning cycle, based on light amounts of the light beams detected by the light detecting portion; and
a switching processing portion configured to switch the light emission amount of each of the light sources based on the switching timing obtained by the obtainment processing portion.

2. The optical scanning device according to claim 1, wherein
the obtainment processing portion obtains the switching timing based on an average value of light amounts of each of the light beams detected by the light detecting portion in a plurality of scanning periods.

3. The optical scanning device according to claim 1, further comprising:
an identification processing portion configured to identify the reflection surface that reflects the light beams emitted from the light sources, wherein
the obtainment processing portion obtains a switching timing in a scanning cycle for each reflection surface identified by the identification processing portion, based on light amounts of light beams detected by the light detecting portion for each reflection surface.

4. The optical scanning device according to claim 3, wherein
the obtainment processing portion obtains the switching timing in the scanning cycle for each reflection surface identified by the identification processing portion, based on an average value of light amounts of each of the light beams detected by the light detecting portion in a plurality of scanning periods for each reflection surface.

5. The optical scanning device according to claim 1, further comprising:
a notification processing portion configured to, when any of light amounts of the light beams detected by the light detecting portion is smaller than a predetermined threshold, notify that cleaning of the reflection surface is necessary.

6. The optical scanning device according to claim 1, further comprising:
a light emission processing portion configured to, at a predetermined timing, cause each of the light sources to emit a light beam based on image data with a predetermined specific light amount that is more intense than a light amount at a time of emission of light, wherein
the obtainment processing portion obtains the switching timing based on light amounts of light beams detected by the light detecting portion when the light sources are caused to emit light beams by the light emission processing portion.

7. An image forming apparatus comprising:
the optical scanning device according to claim 1.

8. An optical scanning method implemented in an optical scanning device including: a rotary polygon mirror having a reflection surface that reflects incident light and configured to scan, in a predetermined scanning cycle, the light reflected on the reflection surface; a plurality of light sources configured to emit, toward the reflection surface, a plurality of light beams that are separated from each other in an axis direction of a rotation shaft of the rotary polygon mirror; and a light detecting portion configured to detect, on a light scanning path of the rotary polygon mirror, a light amount of each of the light beams emitted from the light sources and reflected on the reflection surface,
the optical scanning method comprising;
a first step of obtaining a switching timing to switch a light emission amount of each of the light sources in the scanning cycle, based on light amounts of the light beams detected by the light detecting portion; and
a second step of switching the light emission amount of each of the light sources based on the switching timing obtained in the first step.

* * * * *